US011945212B2

(12) United States Patent
Haenen et al.

(10) Patent No.: US 11,945,212 B2
(45) Date of Patent: Apr. 2, 2024

(54) PRINTER WITH VACUUM DEVICE

(71) Applicant: Canon Production Printing Holding B.V., Venlo (NL)

(72) Inventors: Marcel J. H. M. Haenen, Venlo (NL); Ludovicus M. Heijnders, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 275 days.

(21) Appl. No.: 17/510,718

(22) Filed: Oct. 26, 2021

(65) Prior Publication Data

US 2022/0041390 A1 Feb. 10, 2022

Related U.S. Application Data

(63) Continuation of application No. PCT/EP2020/062224, filed on May 1, 2020.

(30) Foreign Application Priority Data

May 3, 2019 (EP) .................................... 19172564

(51) Int. Cl.
*B41J 11/00* (2006.01)
*B65H 11/00* (2006.01)

(52) U.S. Cl.
CPC .......... *B41J 11/0021* (2021.01); *B41J 11/002* (2013.01); *B41J 11/0085* (2013.01); *B65H 11/005* (2013.01); *B65H 2406/3223* (2013.01)

(58) Field of Classification Search
CPC .............................................. B65H 2406/3221
See application file for complete search history.

(56) References Cited

U.S. PATENT DOCUMENTS

| | | | | |
|---|---|---|---|---|
| 6,382,850 | B1 * | 5/2002 | Freund | B41J 11/663 400/70 |
| 8,413,794 | B2 * | 4/2013 | Herrmann | B65H 5/224 271/96 |
| 10,800,622 | B2 * | 10/2020 | Rietbergen | B65H 5/021 |
| 2004/0164482 | A1 | 8/2004 | Edinger | |
| 2008/0001347 | A1 | 1/2008 | Krause et al. | |
| 2009/0085947 | A1 | 4/2009 | Kado et al. | |

FOREIGN PATENT DOCUMENTS

DE 199 29 316 A1 12/2000

OTHER PUBLICATIONS

European Search Report of application 19 17 2564 dated Oct. 29, 2019.
International Search Report (PCT/ISA/210) issued in PCT/EP2020/062224 dated Jul. 31, 2020.
Written Opinion (PCT/ISA/237) issued in PCT/EP2020/062224 dated Jul. 31, 2020.

* cited by examiner

*Primary Examiner* — Howard J Sanders
(74) *Attorney, Agent, or Firm* — Birch, Stewart, Kolasch & Birch, LLP

(57) ABSTRACT

A printer includes a print station; a media transport mechanism arranged for conveying print media on a transport path past the print station, the transport mechanism having a support surface for supporting the media; and a vacuum device arranged for attracting the media against the support surface on a section of the transport path downstream of the print station. The vacuum device is divided, in the direction along the transport path, into at least two segments in which the media are attractable with different non-zero suction pressures.

9 Claims, 2 Drawing Sheets

PRINTER WITH VACUUM DEVICE

CROSS REFERENCE TO RELATED APPLICATIONS

This application is a Continuation of PCT International Application No. PCT/EP2020/062224, filed on May 1, 2020, which claims priority under 35 U.S.C. 119(a) to Patent Application No. 19172564.7, filed in the Europe on May 3, 2019, all of which are hereby expressly incorporated by reference into the present application.

The invention relates to a printer comprising:

a print station;

a media transport mechanism arranged for conveying print media on a transport path past the print station, the transport mechanism having a support surface for supporting the media; and a vacuum device arranged for attracting the media against the support surface on a section of the transport path downstream of the print station.

More particularly, the invention relates to an ink jet printer.

When ink or another marking material is applied onto the surface of a print media sheet or web, e.g. a sheet of paper, the marking material may cause the material of the sheet to swell or to shrink in those areas where the marking material has been applied. In other areas, where no marking material has been applied, the sheet will neither swell nor shrink, so that the sheet is inevitably caused to cockle. Such cockles compromise the quality of the printed image.

Typically, the cockling becomes maximal after a certain delay time, e.g. a fraction of a second, after the marking material has been applied. The delay time depends upon the speed with which the marking material penetrates into the sheet and causes the same to swell or to shrink. Then, when the sheet is actively or passively dried, the cockles are reduced to some extent, but a certain amount of cockling remains because the swelling of the sheet has produced internal strains in the sheet, and these strains remain even after drying.

An example of the printer of the type mentioned above has been described in US 2009085947 A1.

Here, in order to reduce the cockles, the media sheet is sucked against the support surface with such a high force that the cockles are flattened or do not even start to form.

The vacuum device extends over a certain length in a drying station of the printer, so that the suction pressure is applied until the sheet has been dried and will then remain in the flat, cockle-free state.

This solution, however, has the drawback that producing a high suction pressure increases the energy consumption and also leads to an increased amount of friction when the sheet is conveyed over the suction device. For this reason, in the known printer, the tendency of the media sheet to cockle is predicted on the basis of the known material properties of the media and the marking material, and the suction pressure is adjusted in accordance with the tendency to cockle.

It is also possible to extend the suction device in the upstream direction into a region below the print station, so that the sheet can already be attracted against the support surface when the marking material is applied. Since the sheet is in intimate contact with the support surface in this state, the suction pressure required for retaining the sheet in the flat state is smaller than the suction pressure that would be needed for eliminating the cockles once they have formed.

On the other hand, this solution has several drawbacks. In particular, it makes the thermal decoupling of the print station and the drying station more difficult. Typically, the printed sheets are dried actively by applying heat (e.g. radiation heat) to the sheets. Thus, an increase temperature is desired in the drying station, whereas, in the print station, an increase of heat is undesired because it can cause the ink to dry-out in the nozzles of the print heads, so that the likelihood of the nozzle failures is increased.

Moreover, an arrangement in which the suction device extends over the regions of both, the print station and the drying station makes the overall design of the printer more bulky and is not compatible with a modular design in which the print station and the drying station can be adapted to varying demands independently of one another.

It is therefore an object of the invention to provide a printer which provides a high level of design flexibility and is nevertheless capable of efficiently suppressing cockles with low energy consumption.

In order to achieve this object, according to the invention, the vacuum device is divided, in the direction along the transport path, into at least two segments in which the media are attractable with different non-zero suction pressures.

Independent control of the suction pressure in the at least two segments permits to more finely adjust the suction pressures to the actual necessities, which vary in the course of time and, accordingly, during the movement of the media over the suction device. In this way, cockles can be suppressed with a minimum of energy consumption and friction and without having to extend the suction device into the area of the print station.

More specific optional features of the invention are indicated in the dependent claims.

The media transport mechanism may comprise separate transport sections one of which is used for moving the media past the print station as the other is used for conveying the media further downstream over the vacuum device. The separation between the two transport sections allows for a good thermal decoupling of the print station and the drying station.

The vacuum device may comprise an upstream segment which starts right at the boundary between the two transport sections and in which a high vacuum pressure is created, so that the cockles that may have formed already can reliably be flattened. Then, once the media sheet has fully been attracted against the support surface, the pertinent portion of the media sheet enters a downstream segment of the vacuum device where a smaller vacuum pressure is applied, this pressure being just sufficient for preventing the sheet from cockling again.

Embodiment examples will now be described in conjunction with the drawings, wherein.

Figure 1:
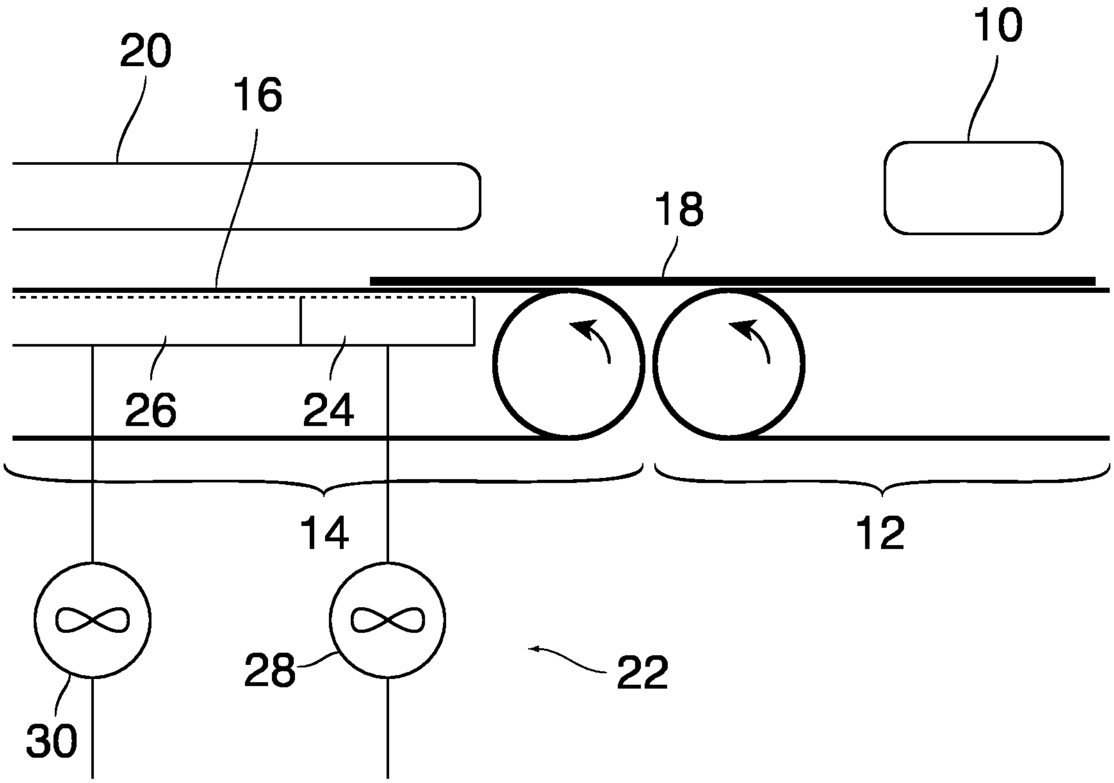
FIG. 1 is a schematic view of essential parts of a printer according to the invention.

As is shown in FIG. 1, an ink jet printer comprises a print station 10 and a media transport mechanism 12, 14 which, in this example, comprises two separate transport sections 12 and 14. Each transport section comprises an endless conveyer belt a top surface of which constitutes a support surface 16 supporting a media sheet 18 that is conveyed past the print station 10 in the upstream transport section 12 and is then handed over to the downstream transport section 14 which moves the sheet past a drying station 20.

The print station 10 may comprise a print head assembly with a plurality of ink jet print heads arranged for jetting ink droplets in different colors onto the surface of the media sheet 18. For example, the ink may be a water-based ink and the media sheet 18 may be a sheet of paper which is wetted by the ink applied thereto.

The drying station 20 may for example comprise a radiator for irradiating the sheet 18 with infrared light, in order to raise the temperature of the sheet and to dry the ink by evaporating the volatile ink components.

The downstream transport section 14 is equipped with a vacuum device 22 comprising two adjacent segments 24, 26 constituted by separate plenum chambers each of which is connected to a blower 28 and 30, respectively.

The plenum chambers in the segments 24 and 26 have a perforated top wall, and the conveyer belt in the transport section 14 is also perforated, so that air is drawn-in through the perforations of the conveyer belt and the top wall of the plenum chambers. In this way, the sheet 18 is attracted against the support surface 16 as it passes over the segments 24 and 26. Consequently, the conveyer belt is pressed against the perforated top walls of the plenum chambers, which causes a certain amount of friction as the sheet 18 and the part of the conveyer belt supporting it move jointly through the drying station 20.

A main purpose of the suction device 22 is to prevent the sheet 18 from cockling, which is an undesired effect that will now be explained in conjunction with FIGS. 2 and 3.

Figure 2:
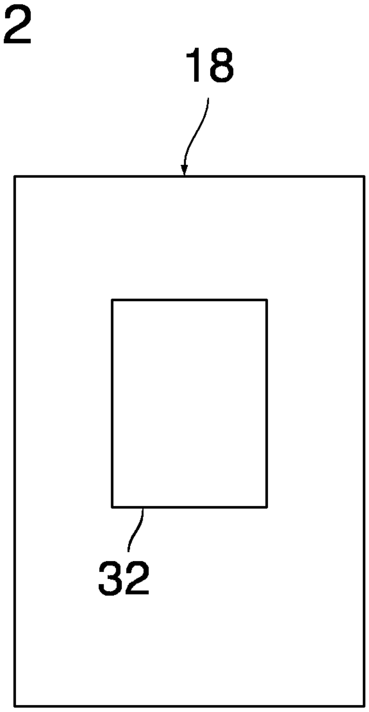
FIG. 2 is a plan view of a media sheet with an image printed thereon.

FIG. 2 is a plan view of the media sheet 18 with an image 32 printed thereon. When the image 32 is being printed in the print station 10, the liquid water-based ink is applied onto the sheet in the area of the image 32 and the water penetrates into the paper of the sheet 18 and causes the same to swell.

Figure 3:
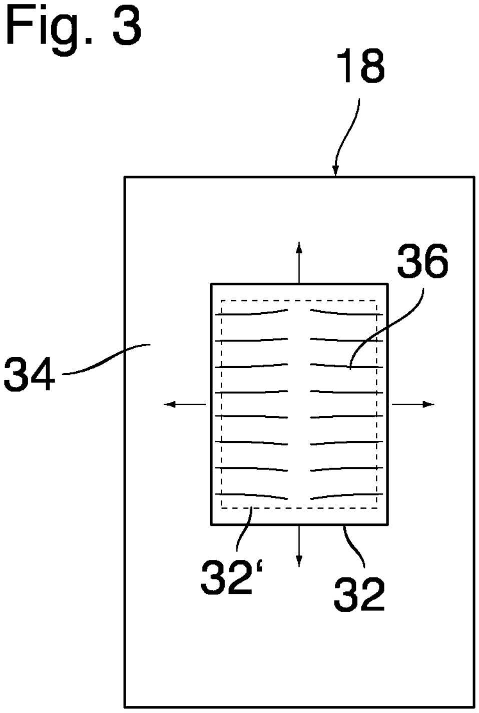
FIG. 3 illustrates the effect of a swelling of the media sheet shown in FIG. 2 in the area of the printed image.

This has been symbolized in FIG. 3, where the image 32 has been shown slightly enlarged, due to the swelling, and the original contour 32' of the image has been shown in phantom lines. The image 32 is surrounded by a margin portion 34 where the paper of the sheet does not swell. This leads to internal strains in the paper and causes the paper to form wrinkles or cockles 36 in the area of the image 32.

Figure 4:
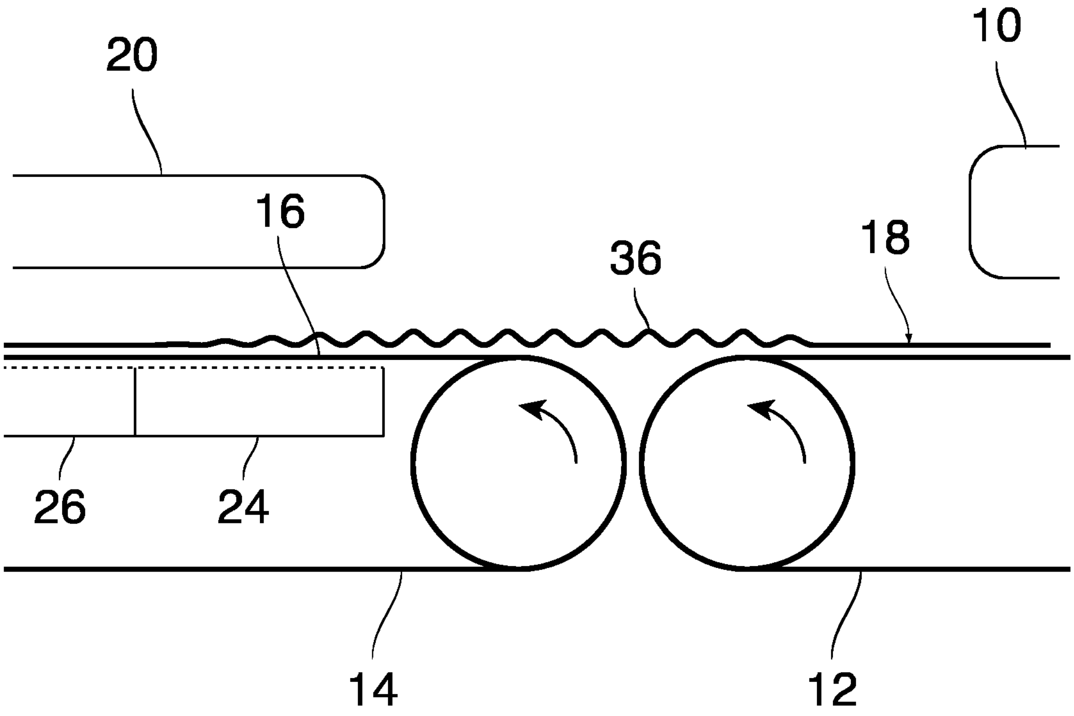
FIG. 4 is an enlarged view of a detail in FIG. 1, showing a cockled sheet, with the height of the cockles being exaggerated.

FIG. 4 shows a part of the printer that has been shown in FIG. 1 on an enlarged scale. A media sheet 18 is just leaving the print station 10, and a leading edge of the sheet has already reached the downstream segment 26 of the vacuum device in the drying station 20. The part of the sheet 18 onto which ink has been applied in order to form the image 32 starts to cockle with a certain delay time which corresponds to the time in which the water penetrates into the paper. As the sheet 18 moves from right to left in FIG. 4, the cockles 36 start to form slightly downstream of the print station 10. For illustration purposes, the height of the cockles 36 has been exaggerated in FIG. 4.

The cockles 36 pass over a transition area from the upstream transport section 12 to the downstream transport section 14. In this transition area, the sheet 18 cannot be attracted against the support surface (actually there is no support surface in the gap between the two conveyer belts), so that the formation of cockles cannot be prevented. However, as soon as the cockles reach the area of the segment 24, they are firmly attracted against the support surface 16 because the blower 28 associated with the plenum chamber of this segment is controlled to create a high vacuum pressure in the order of magnitude of, for example, 3 kPa. Consequently, the height of the cockles 36 decreases from the upstream end to the downstream end of the segment 24, as has been shown in FIG. 4.

The length of the segment 24 in the transport direction, and the vacuum pressure in that segment are selected such that the cockles are eliminated completely at the transition between the segments 24 and 26. Then, since the sheet 18 mates the support surface 16 on its entire area, a smaller vacuum pressure of, e.g., 1 kPa in the plenum chamber of the segment 26 is sufficient for holding the sheet in the flat state and for preventing the cockles from forming again. Eventually, when the corresponding region of the sheet 18 leaves the drying station 20, the paper has been dried to such an extent that no cockles will form anymore.

Thus, the zone above the segment 24 can be considered as a repair zone where a high suction pressure is applied for removing the cockles 36. Since this repair zone is relatively short, the energy consumption of the associated blower 28 and the friction between the conveyer belt and the top wall of the plenum chamber can be kept small. Then, when the sheet passes over the longer segment 26, the energy consumption (of the blower 30) and the friction are kept small because of the reduced vacuum pressure in this segment.

Of course, the concept that has been described above can easily be extended to a design with three or more successive suction zones in which the suction pressures can be controlled independently of one another.

The invention claimed is:

1. A printer comprising:
- a print station;
- a media transport mechanism arranged for conveying print media on a transport path past the print station, the transport mechanism having a support surface for supporting the media; and
- a vacuum device arranged for attracting the media against the support surface on a section of the transport path downstream of the print station,
- wherein the vacuum device is divided, in a direction along the transport path, into at least two segments in which the media are attractable with different non-zero suction pressures, and
- wherein the vacuum device has an upstream segment and a separate downstream segment,
- wherein the suction pressure in the upstream segment is larger than the suction pressure in the downstream segment, and
- wherein a ratio between the suction pressure in the upstream section and the downstream section is between 1.3:1 and 5:1.

2. The printer according to claim 1, the printer being an ink jet printer.

3. The printer according to claim 2, wherein the media transport mechanism has an upstream transport section for conveying the media past the print station, and a separate downstream transport section in which the vacuum device is arranged.

4. The printer according to claim 1, wherein the media transport mechanism has an upstream transport section for conveying the media past the print station, and a separate downstream transport section in which the vacuum device is arranged.

5. The printer according to claim 4, wherein the downstream transport section includes a perforated endless conveyer belt.

6. The printer according to claim 5, wherein a drying station is provided in the downstream transport section.

7. The printer according to claim 4, wherein a drying station is provided in the downstream transport section.

8. The printer according to claim 7, wherein the ratio between the suction pressure in the upstream section and the downstream section is between 2.5:1 and 3.5:1.

9. An ink jet printing method comprising the steps of:
- moving a media sheet past a print station and printing an image onto the media sheet;
- conveying the media sheet with the printed image through a drying station while the media sheet is supported on a support surface; and
- attracting the media sheet against the support surface by means of a vacuum device;
- wherein the step of attracting comprises a first sub-step of attracting the sheet against the support surface with a high suction pressure in order to remove cockles from the sheet, and a second sub-step of holding the sheet in engagement with the support surface by applying a suction pressure that is lower than the suction pressure in the first sub-step, and
- wherein a ratio between the suction pressure in an upstream section and a downstream section is between 1.3:1 and 5:1.

* * * * *